US005455284A

United States Patent [19]

Dahmen et al.

[11] Patent Number: 5,455,284
[45] Date of Patent: Oct. 3, 1995

[54] PROCESS FOR THE PRODUCTION OF WATER-SWELLABLE PRODUCTS USING SUPERFINES OF WATER-SWELLABLE POLYMERS

[75] Inventors: Kurt Dahmen, Mönchengladbach-Rheydt; Richard Mertens, Dahlerdyk; Helmut Brehm, Dachsstrasse, all of Germany

[73] Assignee: Chemische Fabrik Stockhausen GmbH, Krefeld, Germany

[21] Appl. No.: 965,244

[22] PCT Filed: Jul. 2, 1991

[86] PCT No.: PCT/EP91/01232

§ 371 Date: Jun. 7, 1993

§ 102(e) Date: Jun. 7, 1993

[87] PCT Pub. No.: WO92/01008

PCT Pub. Date: Jan. 23, 1992

[30] Foreign Application Priority Data

Jul. 9, 1990 [DE] Germany ............ 40 21 847.3

[51] Int. Cl.$^6$ ............................................. C08F 2/46
[52] U.S. Cl. ............................ 522/85; 522/3; 522/84
[58] Field of Search ................................. 522/85, 3, 84

[56] References Cited

U.S. PATENT DOCUMENTS

| 4,192,727 | 3/1980 | Ward | 128/156 |
|---|---|---|---|
| 4,443,492 | 4/1984 | Roller | 522/182 |
| 4,522,997 | 6/1985 | Schmitz et al. | 522/84 |
| 4,587,308 | 5/1986 | Makita | 525/373 |
| 4,654,039 | 3/1987 | Brandt | 604/368 |
| 4,698,404 | 10/1987 | Cramm | 526/204 |
| 4,727,097 | 2/1988 | Kobayashi | 523/408 |
| 4,833,222 | 5/1989 | Siddall | 526/200 |
| 4,950,692 | 8/1990 | Lewis | 521/45 |
| 5,086,133 | 2/1992 | Itoh | 526/200 |
| 5,248,709 | 9/1993 | Brehm | 523/221 |

*Primary Examiner*—Marion E. McCamish
*Assistant Examiner*—Mark A. Chapman
*Attorney, Agent, or Firm*—Sprung Horn Kramer & Woods

[57] ABSTRACT

The present invention relates to a process for the production of water-swellable products, using very fine particles of water-swellable polymers, characterized by the following steps: a) the very fine particles of water-swellable polymer are dispersed in a monomer which is liquid at room temperature and does not cause the polymeric superfines to swell, b) the dispersion obtained in step a) is mixed with an aqueous monomer solution, c) the mixture obtained in step b) is polymerized by the addition of catalysts and/or by exposure, and d) the polymer gel is comminuted and dried. The present invention further relates to a water-insoluble, water-swellable polymer which absorbs aqueous and serous liquids and blood, and is obtained by the process described above.

9 Claims, No Drawings

PROCESS FOR THE PRODUCTION OF WATER-SWELLABLE PRODUCTS USING SUPERFINES OF WATER-SWELLABLE POLYMERS

The present invention relates to a process for transforming superfines of water-swellable polymers into a form in which they can be reused in application technology, i.e., the present invention relates to a recycling process for these superfines.

In the production of water-swellable polymers, portions of fine particles inevitably result which, due to their small size, cannot be used, e.g., in diapers and incontinency articles, because they lead to dosage difficulties and formation of dust; in addition they have a reduced swell capacity. Fines in water-swellable polymer particles result in products having a reduced swell capacity which is caused by the so-called blocking, i.e., the mixture of particles is blocked up against advancing liquid. Due to the above-mentioned reasons, polymeric fines of smaller than 200 μm, preferably smaller than 100 μm, are separated prior to their use in hygienic articles.

The production of water-swellable polymers is known. U.S. Pat. No. 4,698,404 describes a typical process for the production of water-swellable polymeric particles by inverse suspension polymerization of an aqueous solution consisting of acrylic acid and alkali- or ammonium acrylate in a hydrocarbon and cross-linkage of the polymer.

European patent application A1 0205674 describes the solution polymerization of substantially acid-groups-containing monomers in the presence of an agent having cross-linking activity. After the acid groups in the polymer are neutralized by at least 25% and the polymer gel is dried, a water-swellable polymer with a high gel strength and small amounts of extractable portions is obtained.

European patent application A2 0312952 describes the polymerization of carboxyl-groups-containing monomers, which are neutralize d to the extent of at least 20%, in the presence of dispersed cross-linking agents. European patent application A2 0280541 describes the continuous copolymerization of an acrylic acid-containing monomer solution wherein at least 20% of the acrylic acid is present in neutralized form.

Superfines result in all production processes of water-swellable polymer particles, irrespective of the process form, i.e., solution-, emulsion-, suspension-, or graft polymerization. These superfines deteriorate the properties of the polymer in application technology. They automatically result during the polymerization or subsequent reprocessing operations. These superfines of a size smaller than 200 μm, in particular smaller 100 μm, are separated from the homogeneous mixture, e.g., by screening, prior to the use in hygienic articles. Depending on the fineness of mesh, up to 25% of water-swellable superfines turn up which, up to now, have found limited use in very special forms of application.

Since the water-swellable polymeric superfines are of a great value, many attempts have been made to transform them into a reusable form, e.g., by agglomeration. DE-OS 37 41 157 describes the build-up of granular material by thermally treating a mixture consisting of water-swellable, polymeric superfines with powdery solids capable of being molten or sintered. DE- OS 37 41 158 describes a process for the agglomeration of water-swellable polymeric superfines which is characterized by the fact that: solutions or dispersions are used to build up agglomerates. The disadvantage of agglomerated superfines is their low stability under mechanical stress which, for example, occurs during transport or processing.

U.S. Pat. No. 4,950,692 describes a process for reprocessing water-swellable, polymeric superfines to form a so-called superabsorber, i.e., a polymeric material capable of absorbing large amounts of water or body liquids, in which process the superfines are converted into a gel by means of an aqueous solution and the gel is ground and dried. The aqueous solution used for the formation of the gel comprises a persulfate salt. Treating the water-swellable polymeric superfines with water in order to obtain a homogeneous gel is very expensive from the process technologic point of view, since the distribution of the water is impaired by the above-mentioned blocking so that unwetted, dry polymer is included. A polymer gel containing 30% of a water-swellable polymer—such as that obtained after the solution polymerization of acrylic acid which is present in a partially neutralized form to the extent of 70%—can only be treated in kneaders. In addition, this process for the conversion of water-swellable polymeric superfines into a gel requires large amounts of water which has to be removed again by drying. "Houben-Weyl, Methoden der organischen Chemie" volume XIV/I, page 1043 (1961) describes the production of an easily pourable mass consisting of a suspension of polymethacrylic methylester powder having two different grain sizes in monomeric methacrylic methylester.

In the polymerization of aqueous monomer solutions, recycling of water-swellable polymeric superfines in order to incorporate them in a homogeneously dispersed manner by polymerization is very difficult from the process technological point of view.

Above all, the polymeric superfines tend to swell in contact with aqueous systems and/or water vapor. DE-PS 27 37 994 positively utilizes this property. This patent describes a process for the production of hydrogels, in which process an aqueous monomer solution, e.g., of acrylic acid salt and acrylamide, is polymerized by ionizing radiation. Thickening agents are used as process auxiliaries to render the aqueous monomer mixture immobile and to prevent it from flowing. In addition to high-molecular, water-soluble polymers, which dissolve in the monomer solution and thicken it, water-insoluble polyelectrolyte-hydrogels may also be effective as thickeners, provided that they have a particle size of smaller than 250 μm.

Until today, the undesired swelling of the polymeric particles and the set-up connected therewith, can only be avoided, if a non-polar, organic solvent is used as dispersion medium for the powder particles, as described by U.S. Pat. No. 4,727,097. According to this patent, water-absorbing resins are dispersed, e.g., in n-hexane, cyclohexane, or ligroin, and subsequently impregnated with hydrophilic monomers. However, the use of such volatile, flammable, non-polar solvents renders this process unfavorable for ecological and economic reasons. Even the possible use of polar, water-miscible solvents, e.g., methanol, ethanol, acetone or dioxan, which could suppress the swelling of the polymer powders when mixed with water, results in additional operational steps and thus unfavorably high process costs since the used organic solvent has to be separated and reprocessed in a separate step.

In addition to setting up with one another when contacted with water, water vapor, or aqueous solutions, the particles also tend to stick to conveyors, stirring mechanisms and reactor walls. Coarse, water-swellable polymer particles insufficiently distributed in the monomer solution and resulting from set-up settle down more easily and can form solid layers on the bottom of the polymerization reactor, e.g., a conveying belt; these layers firmly adhere to the reactor and also render comminution of the polymer gel very difficult.

It is accordingly the object of the present invention to provide an economic, process technologically simple process with which the water-swellable, polymeric superfines, which are unavoidably contained in water-swellable polymers manufactured according to the aforementioned processes, can be converted into a form which is acceptable in application technology, i.e., into a reuseable form, and in which process the use of organic solvents as well as additional expensive drying is avoided.

According to the present invention this object is achieved by the following steps:

a) the very fine particles of water-swellable polymers are dispersed in a monomer which is liquid at room temperature and which does not cause the polymer to swell, b) the dispersion is mixed with an aqueous monomer solution, c) the mixture is polymerized by the addition of catalysts and/or by exposure, d) the resultant polymer gel is comminuted, dried and ground.

Liquid monomers, preferably acrylic acid, methacrylic acid, esters of (meth-)acrylic acid, vinyl acetate, vinyl pyrrolidone, dimethylamino-alkyl-(meth-)acrylates, dialkylaminoalkyl-(meth-)acrylamides, or mixtures of these monomers are used as monomers which do not swell the water-swellable polymeric superfines. The dispersion formed from the water-swellable, polymeric superfines and the above-mentioned monomers which are liquid at room temperature and do not cause the superfines to swell is then mixed with an aqueous monomer solution, whereby it is preferred to add the dispersion to the aqueous monomer solution. The aqueous monomer solution preferably comprises catalysts as well as other conventional additives used in polymerization. Polymerization may be carried out according to known methods; it may, for example, be initiated by irradiation instead of using catalysts.

It is preferred to use acrylic acid as monomer, i.e., the water-swellable, polymeric superfines are dispersed in acrylic acid first and then dosed into an aqueous acrylic acid solution. However, it is also possible to use different monomers, e.g., acrylic acid/aqueous acrylamide solution, to form the dispersion of the polymeric superfines and to produce an aqueous monomer solution.

For instance, to disperse the superfines that portion of the acrylic acid is used which is present in the total monomer mixture as non-neutralized portion.

Mixing the dispersion consisting of the water-swellable polymeric superfines and the liquid monomers not causing the superfines to swell with the aqueous monomer solution preferably takes place shortly before the polymerization starts, i.e., shortly before it is placed in the polymerization reactor and immediate start of the polymerization reaction. If acrylic acid is used as non-swelling, liquid monomer, it is—most surprisingly—not necessary to free the dispersion of acrylic acid and superfines from small amounts of oxygen, e.g., by purging with nitrogen, before the dispersion is added to the aqueous monomer solution.

The dispersion obtained in the first process step is adjusted to a content of polymeric superfines of 0.5 to 50%-wt., preferably 5 to 40%-wt.

After mixing the dispersion obtained in the first process step with an aqueous monomer solution according to the second process stage, the content of polymeric superfines, relative to the total amount of monomers, advantageously amounts to 0.1 to 30%-wt., preferably 0.5 to 20%-wt. The polymeric superfines comprise or consist of partially neutralized, cross-linked, hydrogel-forming natural and/or synthetic polymers, the cross-linked water-swellable polyacrylates being preferred as synthetic polymers.

The water-swellable polymeric superfines, which are present during the polymerization stage, have a particle size of smaller than 200 µm, preferably smaller than 100 µm.

The amount of recycled finely divided polymers is determined by the amount of liquid monomers available. Easy handling of the suspension consisting of recycled fine dust and liquid monomers must be ensured. For instance, in case of the cross-linking polymerization of a solution consisting of 30 mol-% acrylic acid and 70 mol-% sodium acrylate, there is a sufficient amount of acrylic acid to recover 15%-wt. polymeric fine dust, relative to the total monomers, so that a pumpable suspension of polymeric fine dust and acrylic acid can be formed.

The process according to the present invention may be carried out in batches or continuously. The continuous procedure is preferred.

If the polymerization process with the recycling of superfines is carried out continuously, an aqueous alkali- or ammonium acrylate solution, which comprises monomer with cross-linking action, is freed from dissolved oxygen to a large extent by purging with nitrogen and transported into the reaction chamber via a pipe line. At the same time, a powder stream of water-swellable polymers is continuously mixed with a monomer, which is liquid at room temperature, or with a mixture of monomers, which does not cause the polymeric superfines to swell, and combined with the aqueous monomer solution shortly before introduction into the reaction chamber. The polymerization is started by adding known catalysts or catalyst systems and/or by exposure to light or irradiation. The obtained rigid gel is pre-crushed coarsely and dried. After drying, grinding and separation of oversize and undersize particles is effected.

To characterize the water-absorbing resins, the powdery resin is screened to 100 to 850 µm, and this fraction is examined with respect to retention, residual monomers, and extractable portions.

The retention is determined according to the tea bag test method and reported as average value of three measurements: approximately 200 mg resin are enclosed into a tea bag and immersed in 0.9% NaCl-solution for 10 minutes. Subsequently, the tea bag is whizzed in a centrifuge (diameter 23 cm) at 1400 rpm for 5 minutes. One tea bag without water-absorbing resin is used as blank:

$$\text{Retention} = \frac{\text{Weight} - \text{blank reading}}{\text{initial weight}} \ g/g$$

To determine the extractable portions, 0.2 g polymer having a particle size of 100 to 850 µm are stirred in 100 g 0.9% salt solution for 1 hour and 16 hours, respectively,. The carboxyl groups are potentiometrically measured in the filtrate of this mixture, and the soluble proportion of the polymer is calculated in consideration of the neutralization degree of the polymer.

The process according to the present invention exhibits several advantages:

Because the predispersion in a medium which does not cause the polymer to swell, a time restriction during the course of the process is advantageously avoided. The dispersion can be handled over a longer period of time. In addition, an improved distribution, even of larger amounts of powdery, fine substances in the aqueous monomer solution is achieved. The liquid medium which does not swell the polymer is not an alien substance but a component of the entire monomer solution. The water-swellable, polymeric superfines contact an aqueous system only shortly before introduction into the polymerization reactor, e.g., a moving conveying belt. This excludes conglutination of the superfines caused by the contact with aqueous solutions or water vapor, or swelling of the polymer particles as well as sticking to walls. Recycling of the water-swellable polymer into the polymerization step is made possible by the described measures.

The described process offers another surprising advantage. The application technological characteristics of the water-swellable polymer—obtained by the addition of large amounts of polymeric, water-swellable fine dust—are substantially determined by the composition of the polymerization batch and the kind and amount of catalysts and not by the characteristics of the superfines, such as swell capacity and extractable portions. This finding offers the opportunity to use superfines with different cross-linking degrees or superfines having a neutralization degree different from the monomer batch.

Furthermore—by the addition to the anhydrous liquid monomer—other water-swellable, synthetic and/or natural polymers and/or derivatives thereof, such as polyvinyl alcohol, polyvinyl pyrrolidone, starch, cellulose, guar, hydroxyethyl- and carboxymethylcellulose, may be used as fine powder and added to the aqueous monomer batch immediately prior to the polymerization in the form of a dispersion.

The present invention will be illustrated in more detail by the following examples:

EXAMPLE 1

A monomer solution of 187.2 g acrylic acid, 368.1 g deionized water, and 1.33 g methylene bisacrylamide is prepared in a cylindrical plastic vessel. Under stirring and cooling, neutralization is effected with 229 g 45% caustic soda lye. The solution is cooled to 6° C. and purged with nitrogen. Subsequently, 1 g azo-bis( 2-amidinopropane)-dihydrochloride, dissolved in 10 g water, 0.044 g 35% hydrogen peroxide, diluted with 2 g water, and 0.8 g sodium peroxidisulfate, dissolved in 5 g water, are added. A suspension of 60 g polymeric superfine particles and 78 g acrylic acid is added to this reaction solution, the suspension being prepared in a separate vessel. The supermicron powder having a particle size of smaller than 100 μm consists of a slightly cross-linked polyacrylate with a tea bag retention value of 36 g/g and an extractable portion of 18% after 16 hours. When the suspension is added to the monomer solution, the polymerization is started by adding 0.027 g ascorbic acid, dissolved in 2 g water; the start of the polymerization can be identified by a temperature elevation of the monomer solution to up to 98° C. After 30 minutes, the resultant gel block is comminuted and dried in hot air at 150° C. The polymer is subsequently ground and screened to a particle size range of 100 to 850 μm.

The water-absorbing polymer exhibits the following properties:

Retention: 28.1 g/g

Extractable portions: 6.5% ( after 16 hours)

Residual acrylic acid: 335 ppm

EXAMPLE 2

Procedure according to that of Example 1; with the exception that polymeric superfines are used (dispersed) which were obtained by grinding a starch-acrylic-acid-graft polymer (tradename: Sanwet IM 1000, Sanyo Chem. Ind.) to smaller than 100 μm.

Retention: 29 g/g

Extractable portions: 7.2% ( 16-hour-value)

Residual acrylic acid: 420 ppm

EXAMPLE 3

Procedure according to that of Example 2; however, fine powder having a particle size of smaller than 200 μm is used, which was obtained by polymerizing acrylic acid in the presence of 4% polyvinyl alcohol in the monomer solution according to Example 4, however, without added fine powder.

Retention: 26 g/g

Extractable portions: 4.0% ( after 1 hour )

Residual acrylic acid: 490 ppm

EXAMPLE 4

A monomer solution obtained by dissolving 1326.6 g acrylic acid and 19.1 g triallyl amine in 2146.9 g water and neutralization with 1497.4 g 45% caustic soda lye, and which was cooled to 8° C. and purged with nitrogen, is dosed on a conveying belt per hour. Simultaneously, a dispersion of 426.7 g acrylic acid and 213.3 g superfine powder is dosed per hour into said stream of monomer solution. In addition, solutions of 3.4 g formamidine sulfinic acid in 166.6 g water, 13.03 g tert-butyl-hydroperoxide in 186.97 g water, and 0.26 g ascorbic acid in 199.74 g water, are added separately and continuously per hour. The polymerization proceeds within 20 minutes with a temperature elevation to approximately 100° C. and formation of a bunch of gel which is subsequently comminuted and dried with hot air at 150° C. The polymer is then ground and screened to a grain size of 100 to 850 μm. The used superfine powder having a particle size of smaller than 100 μm derives from a continuous solution polymerization according to this example, however, without adding polymeric finest particles.

The end product exhibits the following characteristics:

Retention: 25.5 g/g

Extractable portions: 4.5% (after 1 hour)

Residual acrylic acid: 220 ppm

EXAMPLE 5

According to the same procedure as in Example 4, 213.3 g finest particles of Example 4 with a particle size of smaller than 100 μm are used per hour, and the amount of the cross-linking agent triallyl amine is reduced to 14 g per hour.

The obtained product has the following characteristics:

Retention: 28.5 g/g

Extractable portions: 6.5% (after 1 hour)

Residual acrylic acid: 280 ppm

EXAMPLE 6

Example 5 is repeated with the exception that the polymeric superfine portion of Example 4 having a particle size of smaller than 100 μm is used and that the amount of cross-linking agent is reduced to 4.4 g per hour.

Characteristics:

Retention: 35.1 g/g

Extractable portions: 7.7% (after 1 hour)

Residual acrylic acid: 385 ppm

EXAMPLE 7

Example 6 is repeated, different measure: 20%-wt. of the acrylic acid used to disperse the polymeric superfine particles are replaced by methacrylic acid.

Characteristics:

Retention: 36.5 g/g

EXAMPLE 8

Example 7 is repeated but the methacrylic acid used for the polymeric superfines is replaced by vinyl acetate.

Characteristics:

Retention: 32.5 g/g

EXAMPLE 9

A partially neutralized monomer solution cooled to 6° C. and purged with nitrogen, consisting of 1220.3 g acrylic acid, 4.1 g triallyl amine, 2400 g water, and 1365 g 45% caustic soda lye, is hourly dosed on a conveying belt via a pipe line. Simultaneously, a dispersion of 226.6 g starch and 453.4 g acrylic acid is hourly dosed into the stream of monomer solution. In addition, solutions of 6.22 g tertiary butyl hydroperoxide in 197.78 g water, 9.33 g azo-bis-(2-amidinopropane)dihydrochloride in 190.67 g water, and 0.26 g ascorbic acid in 199.74 g water, are continuously dosed per hour to initiate the polymerization. The polymerization takes place within 20 minutes under an elevation of the temperature to approximately 95° C. and formation of a bunch of gel, which, after comminution, is dried with hot air at 120° C. The coarse polymer is ground and screened to a particle size of 200 to 850 µm.

Characteristics:

Retention: 30.4 g/g

We claim:

1. A process for the production of water-swellable products based on partially neutralized, cross-linked natural and/or synthetic polymers, using superfine particles of water-swellable polymers, which process consists essentially of the following steps:

a) dispersing the water-swellable polymeric superfines having a particle size of smaller than 200 µm in a monomer which is liquid at room temperature and does not cause the polymeric superfines to swell and which is selected from the group consisting of acrylic acid, methacrylic acid, vinyl acetate, vinyl pyrrolidone, dimethylamino-alkyl-(meth)-acrylate, dialkylaminoalkyl-(meth-)acryl-amide; and mixtures of these monomers, to form a dispersion with a content of superfines of 0.5 to 50%-wt. based on the weight of dispersion, b) mixing the dispersion obtained in step a) with an aqueous solution containing a cross-linking-agent and a monomer usable in step a) to form a dispersion in which the content of polymeric superfines, relative to the total amount of monomers, amounts to 0.1 to 30%-wt., c) polymerizing the mixture obtained in step b) by means of catalysts and/or by exposure to irradiation to produce a polymer gel, and d) comminuting and drying the polymer gel.

2. The process according to claim 1, wherein the mixing of the dispersion with the aqueous monomer solution according to step b) is effected just before the start of the polymerization according to step c).

3. The process according to claim 1, characterized in that a dispersion having a content of 5 to 40%-wt. based on the weight of dispersion, is produced in step a).

4. The process according to any one of claim 1, characterized in that after mixing the dispersion obtained in step a) with an aqueous monomer solution the portion of polymeric superfines amounts to 0.5 to 20% wt., relative to the total amount of monomers.

5. The process according to claim 4, characterized in that the polymeric superfines are cross-linked, optionally partially neutralized polyacrylates.

6. The process according to claim 1, characterized in that water-swellable polymeric superfines with a particle size of smaller than 100 µm are dispersed in step a) and, after mixing the dispersion according to step b), are polymerized in step c).

7. The process according to claim 1, characterized in that the same monomers are used for the dispersion of the water-swellable polymeric superfines in step a) and for the aqueous monomer solution according to step b).

8. The process according to claim 7, characterized in that acrylic acid is used for the production of the dispersion according to step a), and acrylic acid or partially neutralized acrylic acid is used for the aqueous monomer solution according to step b).

9. A water-insoluble, water-swellable polymer capable of absorbing aqueous and serous liquids as well as blood, which polymer is obtained according to claim 1.

* * * * *

UNITED STATES PATENT AND TRADEMARK OFFICE
CERTIFICATE OF CORRECTION

PATENT NO. : 5,455,284

DATED : October 3, 1995

INVENTOR(S) : Dahmen, et al.

It is certified that error appears in the above-identified patent and that said Letters Patent is hereby corrected as shown below:

Col. 8, line 22    Delete " any one of "

Signed and Sealed this

Twenty-third Day of January, 1996

Attest:

BRUCE LEHMAN

*Attesting Officer*    *Commissioner of Patents and Trademarks*